(12) United States Patent
Lin et al.

(10) Patent No.: US 11,027,252 B2
(45) Date of Patent: Jun. 8, 2021

(54) REACTOR FOR CONTINUOUS PRODUCTION OF GRAPHENE AND 2D INORGANIC COMPOUNDS

(71) Applicant: Nanotek Instruments, Inc., Dayton, OH (US)

(72) Inventors: Yi-jun Lin, Taoyuan (TW);
Hsuan-Wen Lee, Taoyuan (TW);
Aruna Zhamu, Springboro, OH (US);
Bor Z. Jang, Centerville, OH (US)

(73) Assignee: Global Graphene Group, Inc., Dayton, OH (US)

( * ) Notice: Subject to any disclaimer, the term of this patent is extended or adjusted under 35 U.S.C. 154(b) by 0 days.

(21) Appl. No.: 16/654,654

(22) Filed: Oct. 16, 2019

(65) Prior Publication Data
US 2021/0113981 A1    Apr. 22, 2021

(51) Int. Cl.
*B01J 8/00* (2006.01)
*B01J 8/08* (2006.01)
(Continued)

(52) U.S. Cl.
CPC .............. *B01J 8/10* (2013.01); *B01J 8/085* (2013.01); *B01J 8/087* (2013.01); *C01B 32/192* (2017.08);
(Continued)

(58) Field of Classification Search
CPC ....... B01J 8/00; B01J 8/08; B01J 8/085; B01J 8/087; B01J 8/10; B01J 2208/00;
(Continued)

(56) References Cited

U.S. PATENT DOCUMENTS 6,872,330 B2    3/2005  Mack et al.
7,071,258 B1    7/2006  Jang et al.
(Continued)

FOREIGN PATENT DOCUMENTS

CN    103350995 A    10/2013
KR    101573358 B1    12/2015
(Continued)

OTHER PUBLICATIONS

Hummers et al., "Preparation of graphitic oxide" J. Am. Chem. Soc. (1958) vol. 80, p. 1339.
(Continued)

*Primary Examiner* — Natasha E Young

(57) ABSTRACT

Provided is a continuous reactor system for producing graphene or an inorganic 2-D compound, the reactor comprising: (a) a first body comprising an outer wall and a second body comprising an inner wall, wherein the inner wall defines a bore and the first body is configured within the bore and a motor is configured to rotate the first and/or second body; (b) a reaction chamber between the outer wall of the first body and the inner wall of the second body; (c) a first inlet and a second inlet disposed at first end of the reactor and in fluid communication with the reaction chamber; (d) a first outlet and a second outlet disposed downstream from the first inlet, the outlets being in fluid communication with the reaction chamber; and (e) a flow return conduit having two inlets/outlets in fluid communication with two ends of the reactor.

23 Claims, 6 Drawing Sheets

(51) Int. Cl.
*B01J 8/10* (2006.01)
*C01B 32/192* (2017.01)
*C01B 32/198* (2017.01)
*C01B 32/22* (2017.01)

(52) U.S. Cl.
CPC ............ *C01B 32/198* (2017.08); *C01B 32/22* (2017.08); *B01J 2208/00203* (2013.01); *B01J 2208/00212* (2013.01); *B01J 2208/00769* (2013.01); *B01J 2208/00858* (2013.01); *C01B 2204/02* (2013.01); *C01P 2002/72* (2013.01); *C01P 2002/82* (2013.01)

(58) Field of Classification Search
CPC .... B01J 2208/00008; B01J 2208/00017; B01J 2208/00106; B01J 2208/00168; B01J 2208/00203; B01J 2208/00212; B01J 2208/00743; B01J 2208/00769; B01J 2208/00796; B01J 2208/00823; B01J 2208/00858; C01B 32/00; C01B 32/15; C01B 32/182; C01B 32/184; C01B 32/19; C01B 32/192; C01B 32/198; C01B 32/20; C01B 32/21; C01B 32/22; C01B 2204/00; C01B 2204/02; C01P 2002/00; C01P 2002/70; C01P 2002/72; C01P 2002/80; C01P 2002/82
See application file for complete search history.

(56) References Cited

U.S. PATENT DOCUMENTS

| | | |
|---|---|---|
| 7,327,000 B2 | 2/2008 | DeHeer et al. |
| 2017/0334726 A1* | 11/2017 | Hong ..................... C01B 32/05 |
| 2019/0077668 A1 | 3/2019 | Zhamu et al. |
| 2019/0077669 A1 | 3/2019 | Zhamu et al. |

FOREIGN PATENT DOCUMENTS

| | | |
|---|---|---|
| KR | 101573384 B1 | 12/2015 |
| WO | 2019075000 A1 | 4/2019 |

OTHER PUBLICATIONS

Jang et al., "Processing of Nano Graphene Platelets (NGPs) and NGP Nanocomposites: A Review" J. Materials Sci. (2008) vol. 43, pp. 5092-5101.

Yang et al., "Two-dimensional Graphene Nano-ribbons" J. Am. Chem. Soc. (2008) vol. 130, pp. 4216-4217.

* cited by examiner

REACTOR FOR CONTINUOUS PRODUCTION OF GRAPHENE AND 2D INORGANIC COMPOUNDS

FIELD

The present disclosure relates to a method and apparatus of producing graphene materials. The method enables dramatically shortened time and significantly reduced amount of chemicals used to produce graphene.

BACKGROUND

A single-layer graphene sheet is composed of an atomic plane of carbon atoms occupying a two-dimensional hexagonal lattice. Multi-layer graphene is a platelet composed of more than one graphene plane. Individual single-layer graphene sheets and multi-layer graphene platelets are herein collectively called nano graphene platelets (NGPs) or graphene materials. NGPs having 2-10 layers (i.e. 2-10 graphene planes stacked together by van der Walls forces) are commonly referred to as few-layer graphene. Herein, NGPs include pristine graphene (essentially 99% of carbon atoms or higher), slightly oxidized graphene (<5% by weight of oxygen), graphene oxide (≥5% by weight of oxygen), slightly fluorinated graphene (<5% by weight of fluorine), graphene fluoride ((≥5% by weight of fluorine), other halogenated graphene, and chemically functionalized graphene.

NGPs have been found to have a range of unusual physical, chemical, and mechanical properties. For instance, graphene was found to exhibit the highest intrinsic strength and highest thermal conductivity of all existing materials. Although practical electronic device applications for graphene (e.g., replacing Si as a backbone in a transistor) are not envisioned to occur within the next 5-10 years, its application as a nano filler in a composite material and an electrode material in energy storage devices is imminent. The availability of processable graphene sheets in large quantities is essential to the success in exploiting composite, energy storage and conversion, and other applications for graphene.

Our research group was the first to discover graphene as early as 2002 [B. Z. Jang and W. C. Huang, "Nano-scaled Graphene Plates," U.S. patent application Ser. No. 10/274,473, submitted on Oct. 21, 2002; now U.S. Pat. No. 7,071,258 (Jul. 4, 2006)]. The processes for producing NGPs and NGP nanocomposites were reviewed by us [Bor Z. Jang and A Zhamu, "Processing of Nano Graphene Platelets (NGPs) and NGP Nanocomposites: A Review," J. Materials Sci. 43 (2008) 5092-5101]. Our research has yielded a process for rapid, cost-effective, and environmentally benign production of isolated graphene sheets. The process is novel in that is does not follow the established methods for production of nano graphene platelets outlined below. Four main prior-art approaches have been followed to produce NGPs. Their advantages and shortcomings are briefly summarized as follows:

Approach 1: Chemical Formation and Reduction of Graphite Oxide (GO)

The first approach (FIG. 1) entails treating natural graphite powder with an intercalant and an oxidant (e.g., concentrated sulfuric acid and nitric acid, respectively) to obtain a graphite intercalation compound (GIC) or, actually, graphite oxide (GO). [William S. Hummers, Jr., et al., Preparation of Graphitic Oxide, Journal of the American Chemical Society, 1958, p. 1339.] Prior to intercalation or oxidation, graphite has an inter-graphene plane spacing of approximately 0.335 nm ($L_d = \frac{1}{2} d_{002} = 0.335$ nm). With an intercalation and oxidation treatment, the inter-graphene spacing is increased to a value typically greater than 0.6 nm. This is the first expansion stage experienced by the graphite material during this chemical route. The obtained GIC or GO is then subjected to further expansion (often referred to as exfoliation) using either a thermal shock exposure or a solution-based, ultrasonication-assisted graphene layer exfoliation approach.

In the thermal shock exposure approach, the GIC or GO is exposed to a high temperature (typically 800-1,050° C.) for a short period of time (typically 15 to 60 seconds) to exfoliate or expand the GIC or GO for the formation of exfoliated or further expanded graphite, which is typically in the form of a "graphite worm" composed of graphite flakes that are still interconnected with one another. This thermal shock procedure can produce some separated graphite flakes or graphene sheets, but normally the majority of graphite flakes remain interconnected. Typically, the exfoliated graphite or graphite worm is then subjected to a flake separation treatment using air milling, mechanical shearing, or ultrasonication in water. Hence, approach 1 basically entails three distinct procedures: first expansion (oxidation or intercalation), further expansion (or "exfoliation"), and separation.

In the solution-based separation approach, the expanded or exfoliated GO powder is dispersed in water or aqueous alcohol solution, which is subjected to ultrasonication. It is important to note that in these processes, ultrasonification is used after intercalation and oxidation of graphite (i.e., after first expansion) and typically after thermal shock exposure of the resulting GIC or GO (after second expansion). Alternatively, the GO powder dispersed in water is subjected to an ion exchange or lengthy purification procedure in such a manner that the repulsive forces between ions residing in the inter-planar spaces overcome the inter-graphene van der Waals forces, resulting in graphene layer separations.

There are several major problems associated with this conventional chemical production process using a batch-type chemical reactor:

(1) The process requires the use of large quantities of several undesirable chemicals, such as sulfuric acid, nitric acid, and potassium permanganate or sodium chlorate.
(2) The chemical treatment process requires a long intercalation and oxidation time, typically 5 hours to five days.
(3) Strong acids consume a significant amount of graphite during this long intercalation or oxidation process by "eating their way into the graphite" (converting graphite into carbon dioxide, which is lost in the process). It is not unusual to lose 20-50% by weight of the graphite material immersed in strong acids and oxidizers.
(4) Both heat- and solution-induced exfoliation approaches require a very tedious washing and purification step. For instance, typically 2.5 kg of water is used to wash and recover 1 gram of GIC, producing huge quantities of waste water that need to be properly treated.

The present disclosure was made to overcome the limitations outlined above.

Approach 2: Formation of Pristine Graphene

In 2002, our research team succeeded in isolating single-layer and multi-layer graphene sheets from partially carbonized or graphitized polymeric carbons, which were obtained from a polymer or pitch precursor [B. Z. Jang and W. C.

Huang, "Nano-scaled Graphene Plates," U.S. patent application Ser. No. 10/274,473, submitted on Oct. 21, 2002; now U.S. Pat. No. 7,071,258 (Jul. 4, 2006)].

Mack, et al ["Chemical manufacture of nanostructured materials" U.S. Pat. No. 6,872,330 (Mar. 29, 2005)] developed a process that involved intercalating graphite with potassium melt and contacting the resulting K-intercalated graphite with alcohol, producing violently exfoliated graphite containing NGPs. The process must be carefully conducted in a vacuum or an extremely dry glove box environment since pure alkali metals, such as potassium and sodium, are extremely sensitive to moisture and pose an explosion danger. This process is not amenable to the mass production of NGPs. The present disclosure was made to overcome the limitations outlined above.

Approach 3: Epitaxial Growth and Chemical Vapor Deposition of Graphene on Inorganic Crystal Surfaces Small-scale production of ultra-thin graphene sheets on a substrate can be obtained by thermal decomposition-based epitaxial growth and a laser desorption-ionization technique. [Walt A. DeHeer, Claire Berger, Phillip N. First, "Patterned thin film graphite devices and method for making same" U.S. Pat. No. 7,327,000 B2 (Jun. 12, 2003)] Epitaxial films of graphite with only one or a few atomic layers are of technological and scientific significance due to their peculiar characteristics and great potential as a device substrate. However, these processes are not suitable for mass production of isolated graphene sheets for composite materials and energy storage applications.

Approach 4: The Bottom-Up Approach (Synthesis of Graphene from Small Molecules)

Yang, et al. ["Two-dimensional Graphene Nano-ribbons," J. Am. Chem. Soc. 130 (2008) 4216-17] synthesized nano graphene sheets with lengths of up to 12 nm using a method that began with Suzuki-Miyaura coupling of 1,4-diiodo-2, 3,5,6-tetraphenyl-benzene (DITB) with 4-bromophenylboronic acid (BBA). The resulting hexaphenylbenzene derivative was further derivatized and ring-fused into small graphene sheets. This is a slow process that thus far has produced very small graphene sheets. This approach has extremely limited scope of application—only coupling between DITB and BBA works. No other chemical species were found to follow this synthesis route.

Our research group also disclosed novel production processes of graphene materials directly from a precursor of small molecules [Aruna Zhamu and Bor Z. Jang, "U.S. patent application Ser. No. 15/700,756 (Sep. 11, 2017) (US Patent Publication No. 2019/0077669); and U.S. patent application Ser. No. 15/894,234 (Feb. 12, 2018) (US Patent Publication No. 2019/0077668)].

Some recent work makes use of a Couette-Taylor reactor for production of graphene oxide [References 1-7 listed below] or pristine graphene [References 7-8 below].

1. Tae-Young Kim, "Facile synthesis of graphene oxide in a Couette-Taylor flow reactor," Carbon Vol. 83, Pages 217-223, March 2015. DOI: 10.1016/j.carbon.2014.11.024
2. Mohammed AlAmer, Ae Ran Lim, Yong Lak Joo, "Continuous Synthesis of Structurally Uniform Graphene Oxide Materials in a Model Taylor-Couette Flow Reactor," Ind. Eng. Chem. Res. 20195831167-1176; Dec. 14, 2018. https://doi.org/10.1021/acs.iecr.8b04428
3. Won Kyu Park, et al. "Toward Green Synthesis of Graphene Oxide Using Recycled Sulfuric Acid via Couette-Taylor Flow," ACS Omega, 2017, 2, 186-192; DOI: 10.1021/acsomega.6b00352
4. Won Kyu Park, "High-efficiency exfoliation of large-area mono-layer graphene oxide with controlled dimension," Scientific Reports, 7: 16414, Nov. 2017; DOI:10.1038/s41598-017-16649-y
5. "Graphene oxide manufacturing system using Couette-Taylor reactor and method thereof," KR101573384B1, 2015-12-02
6. "Nature-friendly graphene oxide manufacturing system using Couette-Taylor reactor," KR101573358B1, filed on 2015 Oct. 2; granted on 2015-11-25.
7. Yong Lak Joo, et al. "Continuous manufacture of graphenic compounds," WO2019075000A1, 2017-10-112019-04-18; Cornell University
8. Zhi G. Shen, et al. "Turbulence method for preparing high-quality graphene," CN103350995A, 2013-07-122013-10-16; Beijing University of Aeronautics and Astronautics.
9. Tuan Sang Tran, et al. "High shear-induced exfoliation of graphite into high quality graphene by Taylor-Couette flow," RSC Adv., 2016, 6, 12003.

However, these processes or apparatus still suffer from several drawbacks, including relatively low yield, low concentration of isolated single-layer graphene sheets, and the requirement of using multiple apparatus and/or an excessively large number of procedures. The current design of Couette-Taylor reactor requires a long inner cylindrical rod, having a high aspect ratio (rod length/diameter ratio, L/D, typically greater than 20, often greater than 50). The rotation of such a long inner rod relative to the outer annular body means the inner rod experiences an excessively large resistance force imparted by a large amount of viscous fluid being configured to create large amounts of toroidal vortex zones. This would require the implementation of a significantly larger and more powerful electric motor, which would be heavier, more difficult to handle, and much more expensive. The operation of such a long Couette-Taylor reactor normally requires the use of a large amount of un-desirable liquid medium (e.g. sulfuric acid, sodium nitrate, and potassium permanganate). Further, a shorter reactor (e.g. L/D<10) is typically found to be incapable of completing the required chemical reactions and exfoliation of graphene planes.

An urgent need exists for a graphene production process and apparatus that require a reduced amount of undesirable chemical, shortened process time, less energy consumption, reduced effluents of undesirable chemical species into the drainage (e.g., sulfuric acid), higher production yield, and reduced number of apparatus and procedures. A strong need also exists for a process and apparatus that are capable of producing pristine graphene, graphene oxide, and functionalized graphene sheets that contain mostly single-layer or few-layer structures.

SUMMARY

The present disclosure provides process for manufacturing a graphene material (e.g., graphene oxide), the process comprising:
a) injecting a first stock of reactants into a first inlet near a first end (the starting end or stock-feeding end) of a continuous or semi-continuous reactor (e.g. a Couette-Taylor reactor), the first stock comprising graphite, an acid (such as sulfuric acid preferably having a 50% concentration or higher) or an intercalating agent, and/or an oxidizing agent (e.g. potassium permanganate, sodium nitrate, or nitric acid);
b) allowing the reactants to react with one another while being driven to flow from the first end to a second end (the opposing end or reaction product end), downstream from the first inlet, of the reactor to form a first reaction product slurry;

c) driving the reactant product slurry to flow through a conduit (e.g. a pipe or tubing), disposed in working relation to the reactor, back to the first end and re-enter the reactor through a second inlet near the first end, allowing the first product slurry to flow from the first end to the second end of the reactor to form a second reaction product slurry;

d) optionally repeating step (c) for at least one time by driving the second reaction product slurry to flow through the conduit back to the first end and re-enter the reactor through the second inlet, allowing the second product slurry to flow from the first end to the second end of the reactor to form a finishing product slurry; and e) collecting the second reaction product slurry or the finishing product slurry from an outlet of the reactor, disposed downstream from the first inlet, to produce the graphene material.

In some embodiments, the continuous reactor has a flow from the first inlet to the outlet, the flow being a vortex flow. Preferably, the vortex flow is a toroidal vortex flow (e.g., Taylor vortex flow).

In some embodiments, the continuous reactor is configured to produce a toroidal vortex flow. Preferably, the toroidal vortex flow comprises a plurality of non-axisymmetric (e.g., helical) toroidal vortices. Preferably, the continuous reactor is a continuous Couette-Taylor reactor.

In some embodiments, the continuous reactor comprises a reactor chamber into which the first stocks is injected; the reactor chamber being configured between an outer wall of a first cylindrical body and the inner wall of a second cylindrical body or bore, one or both of the first and second cylindrical bodies rotating around the axis thereof. In certain embodiments, the first and second cylindrical bodies are rotating in opposite directions.

The acid in the first stock may be selected from sulfuric acid, nitric acid, phosphoric acid, or a combination thereof. The process may further comprise a step of introducing a quenching agent (e.g. hydrogen peroxide) into the second reaction product slurry after step (c) or into the finishing product slurry after step (d) to terminate the chemical reactions.

The graphite material in the first stock of reactants may be selected from natural graphite, artificial graphite, highly oriented pyrolytic graphite (HOPG), meso-carbon micro-bead (MCMB), carbon fiber, graphite fiber, carbon nano-fiber, graphite nano-fiber, multi-walled carbon nano-tube, soft carbon, hard carbon, activated carbon, meso-phase pitch, needle coke, coal, graphite oxide, graphite halogenide (e.g. graphite fluoride), hydrogenated graphite, nitrogenated graphite, or a combination thereof. The first stock preferably comprises graphite in a concentration of about 0.1 wt. % to about 50 wt. % (e.g., about 2 to about 10 wt. %).

The intercalating agent or oxidizing agent may be selected from an acid, a lithium salt, a sodium salt, a potassium salt, lithium perchlorate, sodium perchlorate, potassium perchlorate, potassium manganese, lithium manganese, sodium manganese, hydrogen peroxide, a metal halide, or a combination thereof. The metal halide is preferably selected from the group consisting of $MCl_2$ (M=Zn, Ni, Cu, Mn), $MCl_3$, (M=Al, Fe, Ga), MCL (M=Zr, Pt), and combinations thereof. The acid may be selected from sulfuric acid, nitric acid, carboxylic acid, phosphoric acid, sorbic acid, acetic acid, or a combination thereof.

In certain embodiments, the graphite is intercalated with sulfuric acid, bisulfate, sulfate, or a combination thereof downstream of the first inlet. Preferably, the intercalated graphite comprises a stage-1 graphite intercalation compound (GIC). In a stage-1 GIC, for each pair of two neighboring graphene planes, there is a layer of intercalating agent (e.g. sulfuric acid) sandwiched between the two graphene planes.

In some embodiments, the graphite or the intercalated graphite is converted to graphite oxide near or at the second end of the reactor. The covalent sulfates of the graphite oxide are hydrolyzed and interlayer registry of the graphite oxide is lost (becoming fully separated graphene oxide sheets or molecules) near or at the second end of the reactor.

The graphene material produced by the presently disclosed process typically comprises single-layer graphene oxide sheets. The graphene material may comprise few-layer graphene oxide sheets (i.e. 2-10 graphene planes). The graphene oxide produced by the instant process typically contains an oxygen content from 20 to 50% by weight of the total graphene oxide weight (more typically higher than 30% and most typically higher than 40%).

The present disclosure also provides a process for manufacturing graphene oxide, the process comprising:

A) injecting a first stock into a continuous reactor through a first inlet at a first end of the continuous reactor having a toroidal vortex flow, wherein the first stock comprises a graphitic material, an acid, and an optional oxidizer and wherein the continuous flow reactor is configured to produce the toroidal vortex flow, enabling the formation of a reaction product slurry at the second end, downstream from the first end, of the continuous reactor; and B) introducing the reaction product slurry from the second end back to enter the continuous reactor through a second inlet (the same as or different from the first inlet) at or near the first end, allowing the reaction product slurry to form a toroidal vortex flow and move down to or near the second end to produce a graphene oxide slurry.

The acid may be selected from sulfuric acid, nitric acid, phosphoric acid, or a combination thereof. The graphitic material is selected from natural graphite, artificial graphite, highly oriented pyrolytic graphite (HOPG), meso-carbon micro-bead (MCMB), carbon fiber, graphite fiber, carbon nano-fiber, graphite nano-fiber, multi-walled carbon nano-tube, soft carbon, hard carbon, activated carbon, meso-phase pitch, needle coke, coal, graphite oxide, graphite halogenide (e.g. graphite fluoride), hydrogenated graphite, nitrogenated graphite, or a combination thereof.

The process may further comprise repeating step (B) for at least one time (e.g. 1-10 times). The process may further comprise a step of collecting the graphene oxide slurry from an outlet of the continuous flow reactor.

Also provided is a process for manufacturing pristine graphene, the process comprising:

(A) injecting a first stock into a continuous reactor through a first inlet at a first end of the continuous reactor having a toroidal vortex flow, wherein the first stock comprises a graphitic material and a non-oxidizing liquid medium, and the continuous flow reactor is configured to produce said toroidal vortex flow, enabling the formation of a reaction product suspension at the second end, downstream from the first end, of said continuous reactor; and (B) introducing said reaction product suspension from said second end back to enter said continuous reactor at or near said first end, allowing said reaction product slurry to form a toroidal vortex flow and move down to or near said second end to produce a pristine graphene suspension.

The graphitic material may be selected from natural graphite, artificial graphite, highly oriented pyrolytic graphite (HOPG), meso-carbon micro-bead (MCMB), carbon fiber, graphite fiber, carbon nano-fiber, graphite nano-fiber, multi-walled carbon nano-tube, soft carbon, hard carbon, activated carbon, meso-phase pitch, needle coke, coal, graphite oxide, graphite halogenide (e.g. graphite fluoride), hydrogenated graphite, nitrogenated graphite, or a combination thereof.

The process may further comprise repeating step (B) for at least one time (e.g. another 1-10 times). The process may further comprise a step of collecting the pristine graphene suspension from an outlet of the continuous flow reactor and drying the suspension to obtain pristine graphene sheets.

In the process, the non-oxidizing liquid medium may comprise water, alcohol, an organic solvent, or a combination thereof. The organic solvent is preferably selected from N-Methyl Pyrrolidone (NMP), Dimethylformamyde (DMF), Benzyl benzoate, γ-Butyrolactone (GBL), or a combination thereof. The non-oxidizing liquid medium may further comprise a surfactant.

The process entails subjecting reacting mass into numerous vortex flow zones having high shear stresses and shear strains therein, enabling fast, uniform, and complete intercalation/oxidation of graphite/carbon particles.

Typically and preferably, the invented method leads to the production of graphene sheets that contain at least 80% single-layer graphene or at least 80% few-layer graphene (defined as graphene sheets having 2-10 graphene planes).

The produced graphene sheets can contain pristine graphene, oxidized graphene with less than 5% oxygen content by weight, graphene fluoride, graphene fluoride with less than 5% fluorine by weight, graphene with a carbon content no less than 95% by weight, or chemically modified graphene.

The present disclosure further provides a continuous reactor or reactor system for producing graphene or an inorganic 2-D compound, said reactor comprising:
a) a first body comprising an outer wall and a second body comprising an inner wall, wherein the inner wall defines a bore and the first body is configured within the bore and wherein a motor is configured to rotate the first and/or second body;
b) a reaction chamber being configured between the outer wall of the first body and the inner wall of the second body;
c) a first inlet and a second inlet disposed at or near a first end of the reactor and being configured to be in fluid communication with the reaction chamber;
d) a first outlet and a second outlet disposed downstream from said first and second inlet at or near a second end of the reactor, the first outlet and the second outlet being configured to be in fluid communication with the reaction chamber; and
e) a flow return conduit (e.g. piping means) having a first conduit inlet in fluid communication with the second outlet of the reactor and having a first conduit outlet in fluid communication with the second inlet of the reactor;
wherein the reactor or reactor system is operated to receive a first stock of reactants, containing a graphitic material or an inorganic layered compound dispersed in a liquid medium, through the first inlet into the reaction chamber, driving the reactants downstream toward the first and second outlet and facilitating reactions between the reactants to produce a first product slurry, driving the first product slurry through the flow return conduit and the second inlet of the reactor to re-enter the reaction chamber, and further driving the first product slurry downstream toward the first and second outlet to form a second product slurry, which is discharged off the reaction chamber through the first outlet of the reactor or driven to flow through the conduit to return to the reaction chamber through the second inlet for at least another time.

The use of such a flow return conduit enables successful exfoliation and separation of graphene planes or 2D inorganic compound platelets using a reactor having a much shorter first body (the inner cylindrical rod). The suitable aspect ratio (rod length/diameter ratio, L/D) is typically lower than 30, often lower than 20, and most often lower than 10. Preferably, the aspect ratio is from 3 to 20 and most preferably from 5 to 15.

The reactor or reactor system typically and preferably further comprises a pump to drive the first or second product slurry through the conduit back to the reaction chamber. The reactor or reactor system may further comprise a pump configured to inject the first stock of reactants into the reaction chamber.

In certain preferred embodiments, the outer wall of the first body defines a cylindrical body. Further preferably, the inner wall of the second body defines a cylindrical bore.

The first body and/or second body may independently comprise a stainless-steel alloy (e.g., 304 stainless steel, 310M stainless steel), an austenitic stainless steel (e.g., Avesta 254 SMO), an austenitic chromium-nickel stainless steel (e.g., 316 stainless steel), a super duplex stainless steel alloy (e.g., ZERON® 100), polytetrafluoroethylene (e.g., TEFLON™), glass (e.g., borosilicate) coated metal, borosilicate glass, polytetrafluoroethylene (e.g., TEFLON™) coated metal, nickel-chromium-molybdenum-tungsten alloy (e.g., Alloy 22), stainless steel with silicon, a Ni—Fe—Cr—Mo alloy (e.g., Alloy 20, Alloy G-30. Alloy 33, Cronder 2803 Mo), a Ni—Cr—Mo alloy (e.g., Alloy C-22, Alloy-C-276, Hastelloy C-2000), an alloy (e.g., LEWMET, Hastelloy D-205, Sandvik HT 9076), lead, high silicon cast iron, cast iron (e.g., Meehanite, grey cast iron), ductile iron (e.g., MONDI), any combination thereof.

The reactor or reactor system may further comprise a cooling jacket or cooling coil in at least partial surrounding relation to the second body. The reactor or reactor system may further comprise a heating jacket or heating coil in at least partial surrounding relation to the second body.

The reactor or reactor system may further comprise at least a stock reservoir, the stock reservoir in fluid contact with the first inlet. The reactor or reactor system may further comprise one or more additional inlet(s), the one or more additional inlet(s) in fluid communication with the reaction chamber, and the one or more additional inlet(s) being configured in a longitudinal position between the first inlet and the first outlet.

In the reactor or reactor system, preferably the continuous reactor has a flow from the first inlet to the first outlet, the flow being a vortex flow. The vortex flow preferably is a toroidal vortex flow (e.g., Taylor vortex flow).

Preferably, the continuous reactor is configured to produce a toroidal vortex flow. The toroidal vortex flow preferably and typically comprises a plurality of non-axisymmetric (e.g., helical) toroidal vortices.

The continuous reactor is preferably a continuous Couette-Taylor reactor. The continuous reactor preferably and typically comprises a reactor chamber into which the first stock is injected; the reactor chamber being configured between an outer wall of a first cylindrical body and the inner wall of a second cylindrical body or bore, one or both of the first and second cylindrical bodies rotating around the axis thereof. In certain embodiments, the first and second cylindrical bodies are rotating in opposite directions.

In some embodiments, the liquid medium contains an acid selected from sulfuric acid, nitric acid, phosphoric acid, or a combination thereof. The graphitic material may be selected natural graphite, artificial graphite, highly oriented pyrolytic graphite (HOPG), meso-carbon micro-bead (MCMB), carbon fiber, graphite fiber, carbon nano-fiber, graphite nano-fiber, multi-walled carbon nano-tube, soft carbon, hard carbon, activated carbon, meso-phase pitch, needle coke, coal, graphite oxide, graphite halogenide, hydrogenated graphite, nitrogenated graphite, or a combination thereof. The liquid medium may further comprise a surfactant.

The inorganic layered compound may be selected from boron nitride (h-BN), $HfS_2$, tungsten disulfide ($WS_2$), $NiTe_2$, $VSe_2$, WSe2, molybdenum disulfide ($MoS_2$), $MoSe_2$, $MoTe_2$, $TaS_2$, $RhTe_2$, $PdTe_2$, $NbS_2$, $NbSe_2$, $NbTe_2$, $TaSe_2$, $Bi_2Se_3$, $Bi_2Te_3$, or a combination thereof.

The present disclosure provides an apparatus or reactor system for efficiently practicing the Couette-Taylor reactor method of producing isolated graphene sheets (including pristine graphene and graphene oxide) and 2D inorganic compounds. Preferably, the reactor is in thermal contact with temperature-controlling means to regulate the temperature of the reacting slurry. In the case of graphene oxide production, the graphite/carbon oxidation and/or intercalation process typically involves rapid liberation of a large amount of heat, which must be rapidly dissipated in order to produce a product with a desired degree of oxidation and/or intercalation and, hence, desired thickness of resulting graphene sheets. The typically small gaps or the reaction chamber between two cylindrical bodies have a relative rotational motion relative to each other allow for rapid heat dissipation. Without rapid heat dissipation in a conventional reactor, there can be danger of explosion. In the process, temperature control means can include circulating a cooling medium around the one or a plurality of flow channels.

DETAILED DESCRIPTION OF PREFERRED EMBODIMENTS

Figure 1A:
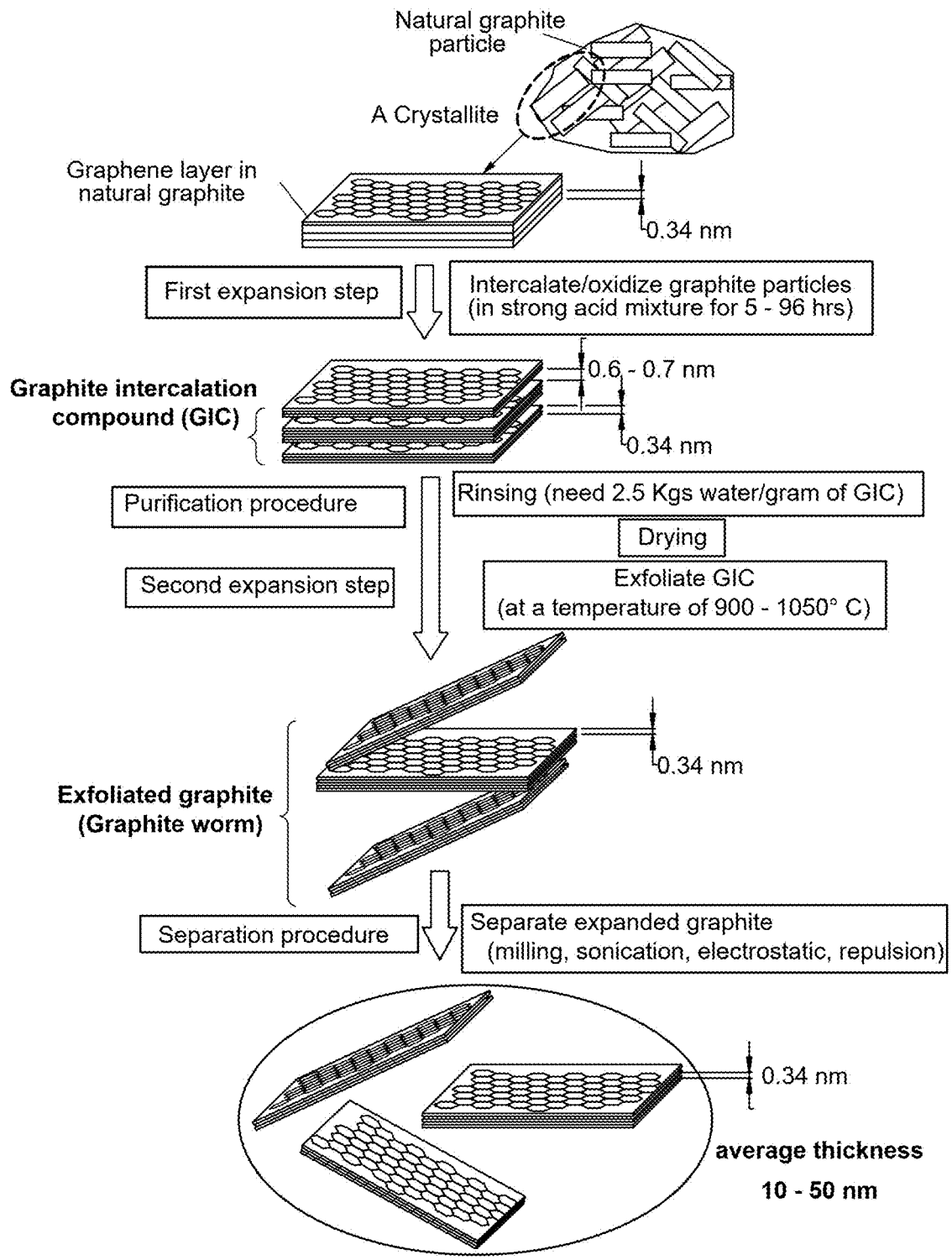
FIG. 1(A) A flow chart showing the most commonly used prior art process of producing highly oxidized graphite and graphene oxide sheets that entails tedious chemical oxidation/intercalation, rinsing, and high-temperature exfoliation procedures.

Carbon materials can assume an essentially amorphous structure (glassy carbon), a highly organized crystal (graphite), or a wide range of intermediate structures that are characterized in that various proportions and sizes of graphite crystallites and defects are dispersed in an amorphous carbon matrix. Typically, a graphite crystallite is composed of multiple graphene planes (planes of hexagonal structured carbon atoms or basal planes) that are bonded together through van der Waals forces in the c-axis direction, the direction perpendicular to the basal plane. These graphite crystallites are typically micron- or nanometer-sized. The graphite crystallites are dispersed in or connected by crystal defects or an amorphous phase in a graphite particle, which can be a natural graphite flake, artificial graphite bead, carbon/graphite fiber segment, carbon/graphite whisker, or carbon/graphite nano-fiber.

One embodiment of the present disclosure is a method of producing isolated/separated graphene sheets or nano graphene platelet (NGP). A NGP is essentially composed of a graphene plane (hexagonal lattice of carbon atoms) or multiple graphene planes stacked and bonded together (typically up to 10 graphene planes per multi-layer platelet). Each graphene plane, also referred to as a graphene sheet, comprises a two-dimensional hexagonal structure of carbon atoms. Each platelet has a length and a width parallel to the graphene plane and a thickness orthogonal to the graphene plane. By definition, the thickness of an NGP can be 100 nanometers (nm) or smaller (preferably containing no greater than 10 hexagonal planes), with a single-sheet graphene being as thin as 0.34 nm. Few-layer graphene refers to the graphene platelet containing 2-10 hexagonal planes of carbon atoms (2-10 graphene planes) bonded together mainly through van der Waals forces).

Currently, the most commonly used graphene production method is the so-called chemical method, referred to in the Background section as "Approach 1: Chemical Formation and Reduction." This method, commonly referred to as the Hummer's method, entails chemical intercalation or oxidation of natural graphite or synthetic graphite particles. These particles are essentially already in the fully graphitized state. Prior to intercalation or oxidation, the graphite particle has an inter-graphene plane spacing as small as approximately 0.335 nm ($L_d=½\ d_{002}=0.335$ nm). Due to the short-range force nature of van der Waals forces, the bonding between closely spaced graphene planes is very strong, making it difficult for any chemical species to intercalate into the inter-graphene spaces.

Hence, it normally takes a combination of a strong acid (e.g. sulfuric acid) and a strong oxidant (e.g. potassium permanganate or nitic acid) and a long reaction time (4-120 hours) to achieve full chemical intercalation or oxidation of graphite to obtain the graphite intercalation compound (GIC) or graphite oxide (GO). With an intercalation and oxidation treatment, the inter-graphene spacing is increased to a value typically greater than 0.6 nm. This is the first expansion stage experienced by the graphite material during this chemical route. The obtained GIC or GO is then subjected to further expansion (often referred to as exfoliation) using either a thermal shock exposure or a solution-based, ultrasonication-assisted graphene layer exfoliation approach.

When the graphene planes contain a sufficient amount of non-carbon atoms or functional groups (e.g. —OH, —COOH, =O, etc.), such as 20% by weight or greater of oxygen in GO, ultrasonication may be used to separate graphene oxide sheets/molecules.

In the thermal shock exposure approach, the GIC or GO is exposed to a high temperature (typically 800-1,050° C.) for a short period of time (typically 15 to 60 seconds) to exfoliate or expand the GIC or GO for the formation of exfoliated or further expanded graphite, which is typically in the form of a "graphite worm" composed of graphite flakes that are still interconnected with one another. This thermal shock procedure can produce some separated graphite flakes or graphene sheets, but normally the majority of graphite flakes remain interconnected. Typically, the exfoliated graphite or graphite worm is then subjected to a flake separation treatment using air milling, mechanical shearing, or ultrasonication in water to produce graphene sheets.

Figure 1B:
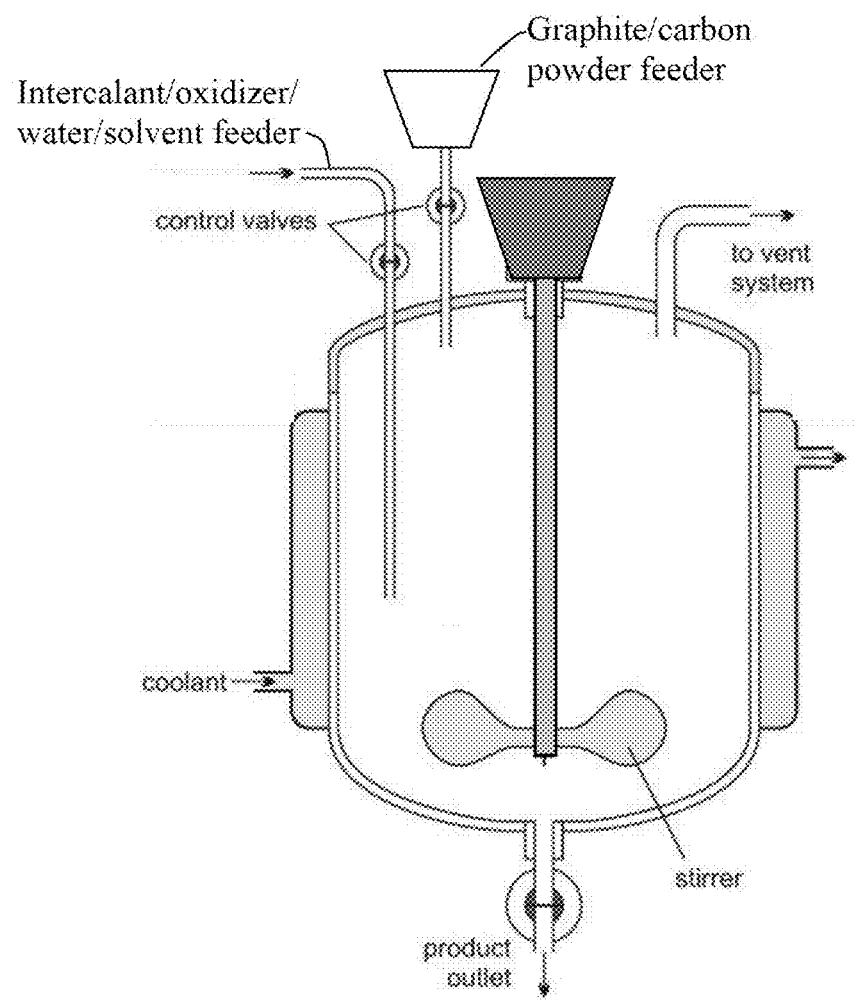
FIG. 1(B) A conventional chemical reactor used for producing highly oxidized graphite and graphene oxide.

As illustrated in FIG. 1(B), the industrial-scale production of GIC or GO and, subsequently, isolated/separated graphene sheets typically requires the use of a massive reactor, from 100 gallons (pilot-scaled or prototyping-scaled) to 10,000 gallons in reactant volume. There are several previously un-recognized problems associated with the use of these massive chemical reactors for chemical intercalation/oxidation of graphite/carbon materials:

1) When a stoichiometric balance amount of graphite/carbon particles and intercalant/oxidizer is introduced into the reactor, the solid content (amount of graphite or carbon particles) is too high and the reacting mixture is too viscous to mechanically stir and disperse properly. In order to overcome this stirring difficulty issue, the operator typically has to add excessively large quantities of liquid intercalants/oxidizers (e.g. sulfuric acid/nitric acid), which are not desirable chemicals and their use must be minimized where possible.
2) Even with vigorous stirring, the graphite/carbon particles cannot be homogeneously mixed and dispersed in such a huge reactor. There are always spots in the reactor where either the graphite/carbon powder is in excess (hence, resulting in incomplete reaction) or the strong acid/oxidizer is in excess (hence, simply "eating away" graphite/carbon, producing CO, $CO_2$ and other volatile species, instead of just intercalating/oxidizing graphite/carbon, resulting in low production yield).
3) It is very difficult to control reaction rates uniformly throughout the entire reacting mass and, thus, reactions are allowed to proceed in a non-optimized manner. One consequence is the notion that the chemical treatment process requires a long intercalation and oxidation time.
4) Some of the reaction steps in chemical intercalation/oxidation are highly exothermic, generating large amounts of heat in a short period of time (high heat production rates). Such high amounts of heat generated in the interior of a chemical reactor, away from the reactor walls (where cooling jacket is wound around), cannot be dissipated fast enough. The internal heat build-up, in turn, generates more heat, leading to auto-acceleration of reactions that could result in material over-heating and even explosion.
5) Oxidation of graphite using the conventional Hummers' method yielded graphite oxide along with a significant amount of non- or under-oxidized graphitic particles under a certain reaction time. To increase yields of graphite oxides that can be exfoliated into single- or few-layer graphene, it often requires either pre-oxidation steps, sequential addition of excess $KMnO_4$, or extended reaction time to several hours.
6) The use of an excessive amount of chemicals also implies the need to repeatedly wash and rinse the reaction products, generating more waste water. The process can exert negative environmental impact.

To achieve large scale production of single-layer or few-layer GO sheets, it is important to oxidize graphite with the intercalating and oxidizing agents fully penetrating between stacked graphene layers and overcome the strong interlayer van der Waals forces. Efficient oxidation or complete intercalation process would give high yields of homogeneously exfoliated and separated GO sheets in a reduced reaction time.

Disclosed herein is a new process and apparatus to produce single-layer or few-layer graphene oxide from bulk graphite with high yields in a significantly shortened reaction time. This process involves the use of a Couette-Taylor flow reactor, in which the oxidation of graphite with an acid (e.g. $H_2SO_4$) and an oxidizing agent (e.g. $KMnO_4$ and/or $NaNO_3$) is accelerated by the turbulent Couette-Taylor vortex flow. The disclosed process and apparatus are applicable to not just Hummer's method, but also other methods such as the well-known Brodie's and Staudinger methods.

Figure 2A:
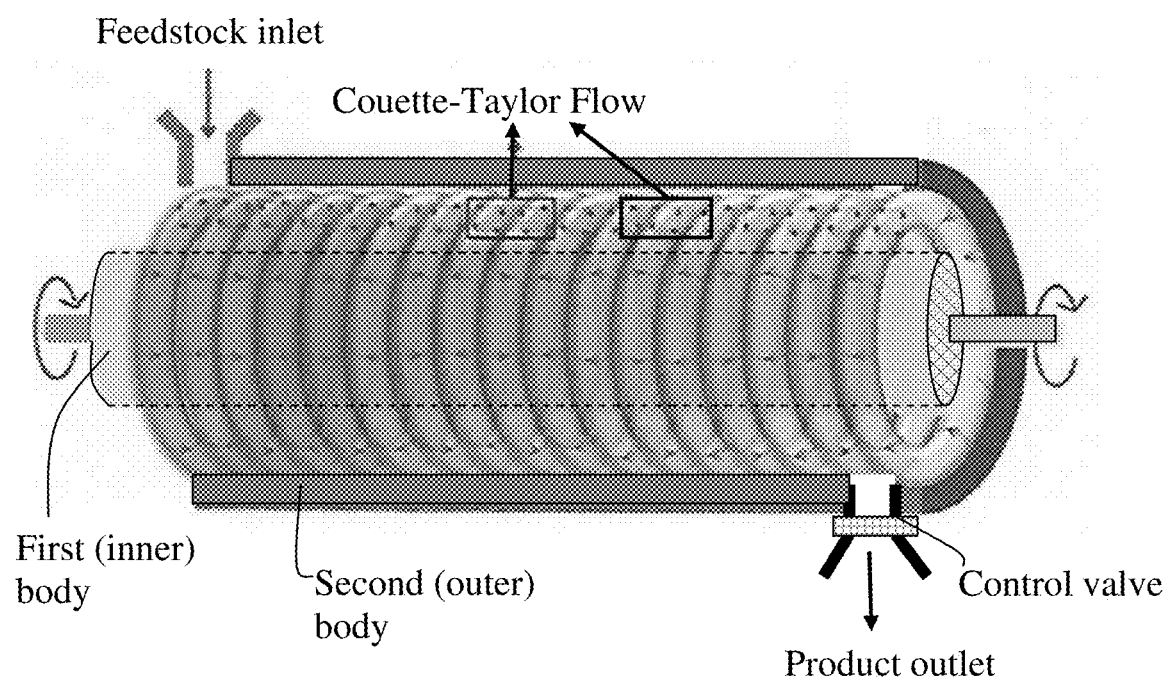
FIG. 2(A) A diagram to schematically illustrate the working principle of a Couette-Taylor reactor, without a flow return conduit.
Figure 2B:
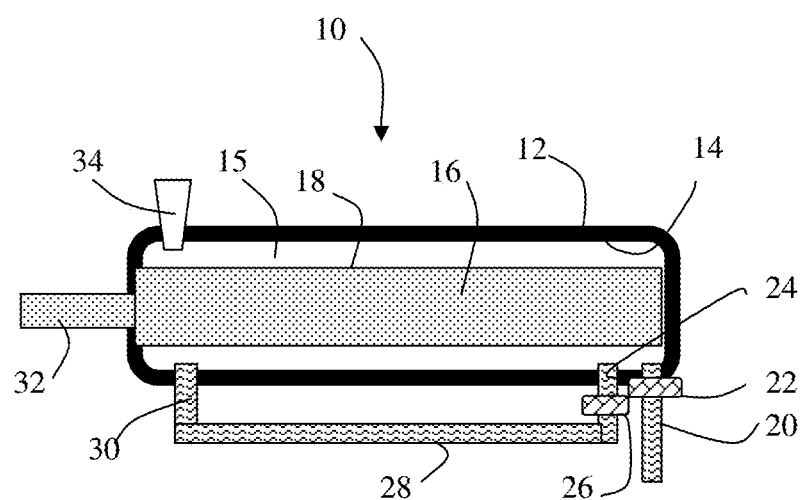
FIG. 2(B) Schematic of a new continuous reactor having a flow return conduit according to some embodiments of the instant disclosure.

As illustrated in FIG. 2(A) for a Couette-Taylor reactor and FIG. 2(B) for a presently disclosed new Couette-Taylor reactor, the reactor consists of two coaxial cylinders with the inner one rotating. At a critical rotating speed, toroidal vortices are created and regularly spaced along the cylinder axis. This toroidal motion of fluids can lead to highly efficient radial mixing of graphite, acid, and oxidizing agents in the system, thereby enhancing the oxidation efficiency.

As discussed in the Background section, the current design of Couette-Taylor reactor requires a long inner cylindrical rod (referred to herein as the first body), having a high aspect ratio; the rod length/diameter ratio typically greater than 20, often greater than 50. The rotation of such a long inner rod relative to the outer annular body (the second body) means the inner rod can experience an excessively large resistance force imparted by a large amount of viscous fluid being configured to create large amounts of toroidal vortex zones. This would require the implementation of a significantly larger and more powerful electric motor, which would be heavier, more difficult to handle, and much more expensive. The operation of such a long Couette-Taylor reactor normally requires the use of a larger amount of un-desirable liquid medium (e.g. sulfuric acid, sodium nitrate, and potassium permanganate) relative to the proportion of solid graphitic material in order for the motor to drive the inner rod at a sufficiently high speed to create the needed Taylor vortex flow.

As schematically illustrated in FIG. 2(B), in some embodiments, the presently disclosed continuous reactor 10 or reactor system for producing sheets of graphene or thin platelets of an inorganic 2-D compound typically comprise the following components: (a) a first body 16 comprising an outer wall 18 and a second body 12 comprising an inner wall 14, wherein the inner wall defines a bore and the first body is configured within the bore and wherein a motor (not shown) is configured to rotate, through a shaft 32, the first and/or second body; (b) a reaction chamber 15 being configured between the outer wall 18 of the first body and the inner wall 14 of the second body; (c) a first inlet 34 and a second inlet 30 disposed at or near a first end of the reactor and being configured to be in fluid communication with the reaction chamber 15; (d) a first outlet 20 and a second outlet 24 disposed downstream from the first and second inlet at or near a second end of the reactor, the first outlet and the second outlet being configured to be in fluid communication with the reaction chamber 15; and (e) a flow return conduit 28 (e.g. piping means) having a first conduit inlet in fluid communication with the second outlet 24 of the reactor and having a first conduit outlet in fluid communication with the second inlet 30 of the reactor. A control valve 26 is implemented to turn on and off the second outlet 24 of the reactor on demand. Another control valve 22 is implemented to open the first outlet 20 of the reactor (for discharging the reaction product slurry out of the reactor upon completion of the needed degree of reaction) and close the first outlet (to direct the first reaction product to flow through the second outlet 24 into the flow return conduit 28 for additional processing) on demand.

In such a design, the reactor or reactor system is operated to receive a first stock of reactants, containing a graphitic material or an inorganic layered compound dispersed in a liquid medium, through the first inlet 34 into the reaction chamber 15, driving the reactants downstream toward the first 20 and second outlet 24 and facilitating reactions between the reactants to produce a first product slurry, driving the first product slurry through the flow return conduit 28 and the second inlet 30 of the reactor to re-enter the reaction chamber 15, and further driving the first product slurry downstream toward the first 20 and second outlet 24 to form a second product slurry, which is either discharged out of the reaction chamber through the first outlet 20 of the reactor (where the control valve 22 being open) or driven to flow through the conduit 28 to return to the reaction chamber 15 through the second inlet 30 for at least another time. Such a design enables the use of a much shorter reactor since the reaction product slurry, if containing un-reacted or incompletely reacted species, may be returned to the reaction chamber for a desired number of times (e.g. repeated for 1-10 times) until a desired final product is obtained. Even for a long reactor, this return flow conduit strategy enables the completion of desired reactions (and/or complete exfoliation and separation of graphene sheets or inorganic compound platelets) in a convenient and cost-effective manner.

As compared to the Hummers method executed in a conventional reactor, the presently disclosed reactor system allows for the production of mostly single-layer or few-layer GO sheets/molecules or pristine graphene sheets at a high yield within an hour of reaction time. This method is also capable of concurrently performing continuous production of graphene sheets and the chemical functionalization of separated graphene sheets.

According to the modified Hummers method, graphite oxide is produced by the oxidation of bulk graphite in the acidic oxidizing medium. During the course of the reaction, the oxidation begins by the oxidizing agent attacking graphene layer, opening up the inter-planar spacing to allow for easier entry of an intercalating agent (e.g. sulfuric acid) and additional oxidizing agent species. The oxidizing agent species penetrating into inter-graphene spacing cause more oxidation and help to further open up the spacing, and so on. To enable the efficient oxidation of graphite, it would be important to enhance the rate of diffusion of the oxidizing agent and intercalating agent into the graphite interlayer and the subsequent oxidation reaction. For this purpose, a new Couette-Taylor flow reactor is used for the efficient mixing and mass transfer of graphite and oxidizing/intercalating agents, thereby enhancing the efficiency and rate of graphite oxidation reaction and separation of graphene oxide sheets.

The intercalating agent or oxidizing agent may be selected from an acid, a lithium salt, a sodium salt, a potassium salt, lithium perchlorate, sodium perchlorate, potassium perchlorate, potassium manganese, lithium manganese, sodium manganese, hydrogen peroxide, a metal halide, or a combination thereof. The metal halide is preferably selected from the group consisting of $MCl_2$ (M=Zn, Ni, Cu, Mn), $MCl_3$ (M=Al, Fe, Ga), MCL (M=Zr, Pt), and combinations thereof. The acid may be selected from sulfuric acid, nitric acid, carboxylic acid, phosphoric acid, sorbic acid, acetic acid, or a combination thereof.

As shown in FIG. 2(A) and FIG. 2(B), the Couette-Taylor reactor consists of two concentric cylinders and the inner cylinder rotates at a controlled speed while the outer cylinder is maintained stationary. A mixture of graphite flakes (or other types of graphitic material), the concentrated acids and oxidizing agents were fed into the reactor. As the rotation speed of the inner cylinder reaches a critical value, it develops the counter-rotating toroidal vortices in a periodic arrangement along the cylinder axis. This Couette-Taylor vortex induces highly effective radial mixing within each vortex cell and uniform fluidic motion, enabling enhanced mass transfer of the reactants. This toroidal motion also causes a high wall shear stress that improves the dispersion of graphite in an acidic oxidizing medium and enhances the rate of diffusion of the oxidizing agent into the inter-graphene spacing of a graphite structure.

In a Couette-Taylor reactor, the hydrodynamic condition of the fluids is dependent on the rotating speed of the inner cylinder relative to the outer cylinder. The Couette-Taylor vortex can be formed when the Taylor number proportional to the angular velocity of the inner cylinder exceeds a critical value. Our studies indicate that the threshold rotation speed is typically from 300 to 500 rpm for the formation of Couette-Taylor vortex that can lead to the efficient oxidation reaction of graphite. In a shearing stress reactor, including the Couette-Taylor reactor, the hydrodynamic condition of the fluids depends on the rotating speed of the inner cylinder. The shearing stress flow is formed when the Taylor number (Ta) proportional to the angular velocity of the inner cylinder exceeds a critical value, which is determined by the following relation:

$$Ta = \left(\frac{d}{R_1}\right)^{1/2} \frac{\omega_1 R_1 d}{v} \qquad \text{(Equation 1)}$$

where $R_1$ is the radius of inner cylinder, w is the angular velocity of the inner cylinder, d is the width of the annular gap (herein also referred to as the reaction chamber), and v is the kinematic viscosity. The viscosity of the reaction mass was found to be typically from 200 to 1,000 cP. The shearing stress increases with rotational speed, resulting in more efficient exfoliation of graphite or layered inorganic compounds at higher shear force. We have further observed that a stoichiometric ratio between the graphite/carbon powder and the intercalant/oxidizer can be maintained (no excess chemicals are required, nor desired) if these reactants are forced to flow through the reaction chamber defined between the inner cylinder and outer cylinder. Further surprisingly, there is no problem of pumping the reaction product slurry back to the reaction chamber through the flow return conduit.

The present disclosure provides a method of producing graphene sheets (single-layer or few layer graphene having 2-10 layers) from particles of a graphite or graphitic carbon material in a significantly shorter period of time, using lesser amounts of intercalant and oxidizer, and achieving a higher production yield (without consuming any significant amount of starting material).

The disclosed process and apparatus are also capable of exfoliating graphitic materials and layered inorganic compounds in a non-oxidizing liquid medium to produce pristine graphene sheets and 2D inorganic compound platelets. In principle, one can divide the reactants in the reaction chamber into a large number of small Taylor vortex zones. These small Taylor vortices of reactants are each a minute high-shear a reactor, capable of exfoliating substantially any type of layered materials.

Thus, the present disclosure also provides a process for manufacturing pristine graphene, the process comprising: (A) injecting a first stock into a continuous reactor through a first inlet at a first end of the continuous reactor having a toroidal vortex flow, wherein the first stock comprises a graphitic material and a non-oxidizing liquid medium, and the continuous flow reactor is configured to produce said toroidal vortex flow, enabling the formation of a reaction product suspension at the second end, downstream from the first end, of said continuous reactor; and (B) introducing said reaction product suspension from said second end back to enter said continuous reactor at or near said first end, allowing said reaction product slurry to form a toroidal vortex flow and move down to or near said second end to produce a pristine graphene suspension.

The graphitic material may be selected from natural graphite, artificial graphite, highly oriented pyrolytic graphite (HOPG), meso-carbon micro-bead (MCMB), carbon fiber, graphite fiber, carbon nano-fiber, graphite nano-fiber, multi-walled carbon nano-tube, soft carbon, hard carbon, activated carbon, meso-phase pitch, needle coke, coal, graphite oxide, graphite halogenide (e.g. graphite fluoride), hydrogenated graphite, nitrogenated graphite, or a combination thereof.

The process may further comprise repeating step (B) for at least one time (e.g. another 1-10 times). The process may further comprise a step of collecting the pristine graphene suspension from an outlet of the continuous flow reactor and then drying the suspension to obtain pristine graphene sheets.

In the process, the non-oxidizing liquid medium may comprise water, alcohol, an organic solvent, or a combination thereof. The organic solvent is preferably selected from N-Methyl Pyrrolidone (NMP), Dimethylformamyde (DMF), Benzyl benzoate, 7-Butyrolactone (GBL), or a combination thereof. The non-oxidizing liquid medium may further comprise a surfactant.

The process entails subjecting reacting mass into numerous vortex flow zones having high shear stresses and shear strains therein, enabling fast, uniform, and complete intercalation/oxidation of graphite/carbon particles. Typically and preferably, the invented method leads to the production of graphene sheets that contain at least 80% single-layer graphene or at least 80% few-layer graphene (defined as graphene sheets having 2-10 graphene planes).

The following examples serve to provide the best modes of practice for the present disclosure and should not be construed as limiting the scope of the disclosure:

Example 1: Production of GO Sheets Via Hummer's Method Using a Conventional Reactor and a Couette-Taylor Reactor Graphite oxide as prepared by oxidation of natural graphite flakes with sulfuric acid, nitrate, and permanganate according to the method of Hummers [U.S. Pat. No. 2,798,878, July 9, using both a conventional reactor (100 gallons=0.3785 $m^3$) and the presently disclosed Couette-Taylor reactor (inner cylinder having a diameter of approximately 18 cm and a length of about 85 cm. We found that the instant reactor design enables the production of an equal amount of graphene oxide (after 2 passes) in 45 minutes using approximately 65% of the chemicals (vs. 5 hours of the conventional reactor).

Figure 3A:
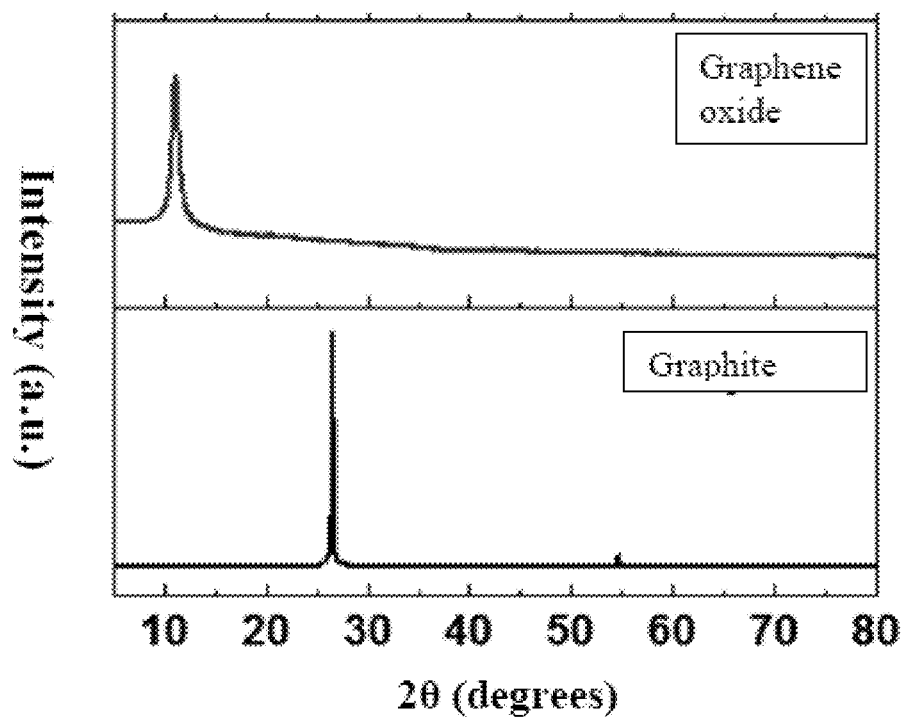
FIG. 3(A) X-ray diffraction data of original graphite and the graphene oxide powder produced by the new Couette-Taylor reactor, indicating fully separated graphene oxide sheets.
Figure 3B:
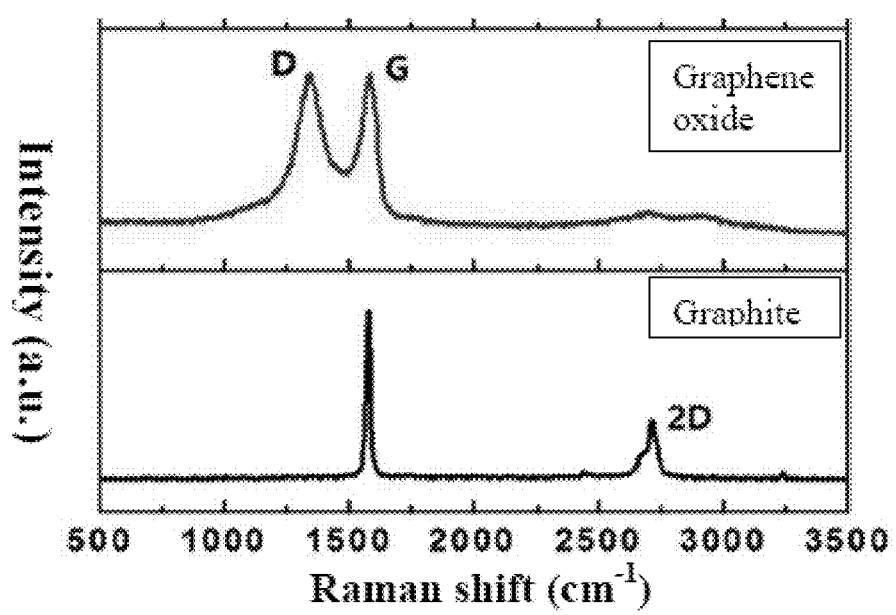
FIG. 3(B) Raman spectra of original graphite and the graphene oxide powder produced by the new Couette-Taylor reactor.

Upon completion of the reaction, each mixture was separately poured into deionized water and filtered. The graphite oxide was repeatedly washed in a 5% solution of HCl to remove most of the sulfate ions. The sample was then washed repeatedly with deionized water until the pH of the filtrate was 5.0. The slurry was spray-dried and stored in a vacuum oven at 60° C. for 24 hours. The interlayer spacing of the resulting laminar graphite oxide powder was determined by the Debey-Scherrer X-ray technique to be approximately 0.73 nm (from conventional reactor), which requires an additional procedure (e.g. ultrasonication) to fully exfoliate and separate individual graphene oxide sheets. In contrast, as indicated in FIG. 3(A), the graphene oxide powder produced by the instant reactor has completely lost the registry (characteristic peak at $2\theta=26$ degrees) of the un-treated graphite. The Raman spectra, FIG. 3(B), further confirm the formation of graphene oxide sheets. Surface area was measured via nitrogen adsorption BET for both samples. The sample from the conventional bulk reactor exhibits a specific surface area of 375 $m^2/g$ (mostly few-layer graphene sheets) after thermal exfoliation and that from presently invented reactor 975 $m^2/g$ (mostly single-layer graphene oxide sheets).

In addition to natural graphite, we have tested other starting graphitic materials, including synthetic graphite, amorphous graphite (microcrystalline graphite), pieces of highly oriented pyrolytic graphite, meso-carbon micro-bead (MCMB), graphitized meso-phase carbon, needle coke, pitch-based carbon fiber, pitch-based graphite fiber, vapor-grown carbon nano-fiber, graphitic nano-fiber, graphite fluoride, chemically modified graphite, and expanded graphite. The invented process and reactor surprisingly work well for all these starting materials.

A wide variety of intercalants and oxidizers have also been tested. We have found that the method works well for all these chemicals, requiring different temperatures and reactant flow rates.

Example 2: Pristine Graphene from Natural Graphite Flakes

Five grams of graphite flakes, ground to approximately 20 μm or less in sizes, were dispersed in 1,000 mL of deionized water (containing 0.1% by weight of a dispersing agent, Zonyl® FSO from DuPont) to obtain a suspension. The suspension was injected into the first inlet of a Couette-Taylor reactor (same as in Example 1), which was operated at 600 RPM. After three passes, (passing through the reaction chamber three times), graphite was highly exfoliated and separated to produce pristine graphene sheets that are mostly few-layer graphene.

Example 3: Graphene Oxide from Short Carbon Fiber Segments

The procedure was similar to that used in Example 1, but the starting material was pitch-based graphite fibers chopped into segments with 0.2 mm or smaller in length prior to dispersion in water. The diameter of carbon fibers was approximately 12 μm. After three passes, graphite fiber segments are exfoliated and separated into graphene oxide sheets, mostly single-layer GO sheets.

Example 4: Pristine Graphene Sheets from Carbon Nano-Fibers (CNFs)

A powder sample of graphitic nano-fibers was prepared by introducing an ethylene gas through a quartz tube pre-set at a temperature of approximately 800° C. Also contained in the tube was a small amount of nano-scaled Cu—Ni powder supported on a crucible to serve as a catalyst, which promoted the decomposition of the hydrocarbon gas and growth of CNFs. Approximately 2.5 grams of CNFs (diameter of 10 to 80 nm) were dispersed in water (as in Sample 2). The sample was then allowed to pass through a Couette-Taylor reactor at 20° C. twice to effect exfoliation and separation. This procedure was completed in 15 minutes. Fine graphene sheets with an average thickness of 1.05 nm were obtained.

Example 5: Preparation of Graphene Oxide Sheets from Meso-Carbon Micro-Beads (MCMBs) for Bi-Polar Electrodes Meso-carbon microbeads (MCMBs) were supplied from China Steel Chemical Co. This material has a density of about 2.24 g/cm$^3$ with a median particle size of about 16 μm. As control samples, MCMB (100 grams) were intercalated with an acid solution (sulfuric acid, nitric acid, and potassium permanganate at a ratio of 4:1:0.05) for 72 hours in a conventional reactor. Upon completion of the reaction, the mixture was poured into deionized water and filtered. The intercalated MCMBs were repeatedly washed in a 5% solution of HCl to remove most of the sulfate ions. The sample was then washed repeatedly with deionized water until the pH of the filtrate was neutral. The slurry was dried and stored in a vacuum oven at 60° C. for 24 hours. The dried powder sample was placed in a quartz tube and inserted into a horizontal tube furnace pre-set at a desired temperature, 1,080° C. for 45 seconds to obtain a graphene material. TEM and atomic force microscopic studies indicate that most of the NGPs were single-layer graphene.

Separately, MCMB (100 grams) were mixed with an acid solution (sulfuric acid, nitric acid, and potassium permanganate at a ratio of 4:1:0.05) to form a slurry. The slurry was injected into the first inlet and driven to pass through the new Couette-Taylor reactor four times (as short as 65 minutes vs. 72 hours of the conventional reactor). The resulting graphene oxide sheets are mostly single-layer as well, which was achieved in a dramatically reduced period of time.

Example 6: Production of Molybdenum Diselenide Nano Platelets

The same sequence of steps as in Example 2 can be utilized to form nano platelets from other layered compounds: dispersion of a layered compound in a liquid medium and passing through the Couette-Taylor reactor three times. Dichalcogenides, such as $MoS_2$, have found applications as electrodes in lithium ion batteries and as hydro-desulfurization catalysts.

For instance, $MoSe_2$ consisting of Se—Mo—Se layers held together by weak van der Waals forces can be exfoliated via the presently invented process. Intercalation can be achieved by dispersing $MoSe_2$ powder in a silicon oil beaker, with the resulting suspension subjected injected into the first inlet of the reactor, which was operated with 650 RPM for 25 minutes per pass. The resulting $MoSe_2$ platelets were found to have a thickness in the range from approximately 1.4 nm to 13.5 nm with most of the platelets being mono-layers or double layers.

Other single-layer platelets of the form $MX_2$ (transition metal dichalcogenide), including $MoS_2$, $TaS_2$, and $WS_2$, were similarly exfoliated. In particular, the inorganic layered compound is selected from boron nitride (h-BN), $HfS_2$, tungsten disulfide ($WS_2$), $NiTe_2$, $VSe_2$, WSe2, molybdenum disulfide ($MoS_2$), $MoSe_2$, $MoTe_2$, $TaS_2$, $RhTe_2$, $PdTe_2$, $NbS_2$, $NbSe_2$, $NbTe_2$, $TaSe_2$, $Bi_2Se_3$, and $Bi_2Te_3$. Again, most of the platelets were mono-layers or double layers after subjecting the layered inorganic compound through the new Couette-Taylor reactor for 2-5 passes. This observation clearly demonstrates the versatility of the presently invented process and reactor system in terms of producing relatively uniform-thickness platelets that are ultra-thin.

The invention claimed is:
1. A continuous reactor or reactor system for producing graphene or an inorganic 2-D compound, said reactor comprising:
   A) a first body comprising an outer wall and a second body comprising an inner wall, wherein the inner wall defines a bore and the first body is configured within the bore and wherein a motor is configured to rotate the first and/or second body at a rate of from 300 to 500 rpm;
   B) a reaction chamber being configured between the outer wall of the first body and the inner wall of the second body;
   C) a first inlet and a second inlet disposed at or near a first end of the reactor and being configured to be in fluid communication with the reaction chamber;
   D) a first outlet and a second outlet disposed downstream from said first and second inlet at or near a second end of the reactor, the first outlet and the second outlet being configured to be in fluid communication with the reaction chamber; and
   E) a flow return conduit having a first conduit inlet in fluid communication with the second outlet of the reactor and having a first conduit outlet in fluid communication with the second inlet of the reactor;
   wherein said reactor or reactor system is operated to receive a first stock of reactants, containing a graphitic material or an inorganic layered compound dispersed in a liquid medium, through the first inlet into the reaction chamber, driving the reactants downstream toward said first and second outlet and facilitating reactions between the reactants to produce a first product slurry, driving the first product slurry through the flow return conduit and the second inlet of the reactor to re-enter the reaction chamber, and further driving the first product slurry downstream toward the first and second outlet to form a second product slurry, which is discharged off the reaction chamber through the first outlet of the reactor or driven to flow through the conduit to return to the reaction chamber through the second inlet for at least another time, wherein the first body has a length and a diameter and the length-to-diameter ratio is no greater than 30.

2. The reactor or reactor system of claim 1, further comprising a pump to drive the first or second product slurry through the conduit back to the reaction chamber.

3. The reactor or reactor system of claim 1, further comprising a pump configured to inject the first stock of reactants into the reaction chamber.

4. The reactor or reactor system of claim 1, wherein the outer wall of the first body defines a cylindrical body.

5. The reactor or reactor system of claim 1, wherein the inner wall of the second body defines a cylindrical bore.

6. The reactor or reactor system of claim 1, wherein the first body has a length and a diameter and the length-to-diameter ratio is from 3 to 20.

7. The reactor or reactor system of claim 1, wherein the first body and/or second body independently comprise a stainless-steel alloy, an austenitic stainless steel, an austenitic chromium-nickel stainless steel, a super duplex stainless steel alloy, polytetrafluoroethylene (PTFE), glass coated metal, borosilicate glass, PTFE-coated metal, nickel-chromium-molybdenum-tungsten alloy, stainless steel with silicon, a Ni—Fe—Cr— Mo alloy, a Ni—Cr—Mo alloy, an alloy, lead, high silicon cast iron, cast iron, ductile iron, or a combination thereof.

8. The reactor or reactor system of claim 1, further comprising a cooling jacket or cooling coil in at least partial surrounding relation to the second body.

9. The reactor or reactor system of claim 1, further comprising a heating jacket or heating coil in at least partial surrounding relation to the second body.

10. The reactor or reactor system of claim 1, further comprising at least a stock reservoir, the stock reservoir in fluid contact with the first inlet.

11. The reactor or reactor system of claim 1, further comprising one or more additional inlet(s), the one or more additional inlet(s) in fluid communication with the reaction chamber, and the one or more additional inlet(s) being configured in a longitudinal position between the first inlet and the first outlet.

12. The reactor or reactor system of claim 1, wherein the continuous reactor has a flow from the first inlet to the first outlet, the flow being a vortex flow.

13. The reactor or reactor system of claim 12, wherein the vortex flow is a toroidal vortex flow.

14. The reactor or reactor system of claim 1, wherein the continuous reactor is configured to produce a toroidal vortex flow.

15. The reactor or reactor system of claim 13, wherein the toroidal vortex flow comprises a plurality of non-axisymmetric toroidal vortices.

16. The reactor or reactor system of claim 1, wherein the continuous reactor is a continuous Couette-Taylor reactor.

17. The reactor or reactor system of claim 1, wherein the continuous reactor comprises a reactor chamber into which the first stock is injected; the reactor chamber being configured between an outer wall of a first cylindrical body and the inner wall of a second cylindrical body or bore, one or both of the first and second cylindrical bodies rotating around the axis thereof.

18. The reactor or reactor system of claim 1, wherein the first and second cylindrical bodies are rotating in opposite directions.

19. The reactor or reactor system of claim 1, wherein the liquid medium contains an acid selected from sulfuric acid, nitric acid, phosphoric acid, or a combination thereof, wherein at least 80% of the graphene sheets within product slur, which is not sent to an inlet, are single layer graphene sheets.

20. The reactor or reactor system of claim 1, wherein the graphitic material is selected natural graphite, artificial graphite, highly oriented pyrolytic graphite (HOPG), mesocarbon micro-bead (MCMB), carbon fiber, graphite fiber, carbon nano-fiber, graphite nano-fiber, multi-walled carbon nano-tube, soft carbon, hard carbon, activated carbon, mesophase pitch, needle coke, coal, graphite oxide, graphite halogenide, hydrogenated graphite, nitrogenated graphite, or a combination thereof.

21. A continuous reactor or reactor system for producing an inorganic 2-D compound, said reactor comprising:
A) a first body comprising an outer wall and a second body comprising an inner wall, wherein the inner wall defines a bore and the first body is configured within the bore and wherein a motor is configured to rotate the first and/or second body;
B) a reaction chamber being configured between the outer wall of the first body and the inner wall of the second body;
C) a first inlet and a second inlet disposed at or near a first end of the reactor and being configured to be in fluid communication with the reaction chamber;
D) a first outlet and a second outlet disposed downstream from said first and second inlet at or near a second end of the reactor, the first outlet and the second outlet being configured to be in fluid communication with the reaction chamber; and
E) a flow return conduit having a first conduit inlet in fluid communication with the second outlet of the reactor and having a first conduit outlet in fluid communication with the second inlet of the reactor;
wherein said reactor or reactor system is operated to receive a first stock of reactants, containing an inorganic layered compound dispersed in a liquid medium, through the first inlet into the reaction chamber, driving the reactants downstream toward said first and second outlet and facilitating reactions between the reactants to produce a first product slurry, driving the first product slurry through the flow return conduit and the second inlet of the reactor to re-enter the reaction chamber, and further driving the first product slurry downstream toward the first and second outlet to form a second product slurry, which is discharged off the reaction chamber through the first outlet of the reactor or driven to flow through the conduit to return to the reaction chamber through the second inlet for at least another time, wherein the inorganic layered compound is selected from boron nitride (h-BN), $HfS_2$, tungsten disulfide ($WS_2$), $NiTe_2$, $VSe_2$, WSe2, molybdenum disulfide ($MoS_2$), $MoSe_2$, $MoTe_2$, $TaS_2$, $RhTe_2$, $PdTe_2$, $NbS_2$, $NbSe_2$, $NbTe_2$, $TaSe_2$, $Bi_2Se_3$, $Bi_2Te_3$, or a combination thereof.

22. The reactor or reactor system of claim 1, wherein said liquid medium further comprises a surfactant.

23. The reactor or reactor system of claim 1, further comprising a cooling jacket or cooling coil and/or a heating jacket or heating coil in at least partial surrounding relation to the second body.

* * * * *